United States Patent [19]
Baker et al.

[11] Patent Number: 6,032,703
[45] Date of Patent: Mar. 7, 2000

[54] AUTOMOTIVE VEHICLE FUELING SYSTEM

[75] Inventors: Richard Eugene Baker, Dearborn Heights; Bradford Bates, Ann Arbor, both of Mich.

[73] Assignee: Ford Global Technologies, Inc., Dearborn, Mich.

[21] Appl. No.: 09/149,855

[22] Filed: Sep. 8, 1998

[51] Int. Cl.$^7$ ................................................. B65B 1/30
[52] U.S. Cl. .................................. 141/94; 141/4; 141/9; 141/11; 141/94; 141/98; 141/100; 141/102; 141/104; 141/105; 340/825.34; 340/825.35
[58] Field of Search .................................. 141/4, 5, 9, 11, 141/83, 94, 98, 100, 102–105, 231; 340/825.34, 825.35; 222/26, 28, 145.1

[56] References Cited

U.S. PATENT DOCUMENTS

| | | |
|---|---|---|
| 4,131,215 | 12/1978 | Hansel . |
| 4,161,160 | 7/1979 | Hicks et al. . |
| 4,253,436 | 3/1981 | Dudrey . |
| 4,568,248 | 2/1986 | Harders . |
| 5,018,645 | 5/1991 | Zinsmeyer . |
| 5,163,586 | 11/1992 | Zinsmeyer . |
| 5,251,785 | 10/1993 | Hayden et al. . |
| 5,331,994 | 7/1994 | Bryan, III et al. . |
| 5,343,906 | 9/1994 | Tibbals, III ............................ 141/83 |
| 5,421,295 | 6/1995 | Lemaire et al. . |
| 5,605,182 | 2/1997 | Oberrecht et al. ................... 141/94 |
| 5,794,667 | 8/1998 | Payne et al. . |

*Primary Examiner*—Henry J. Recla
*Assistant Examiner*—Timothy L. Maust
*Attorney, Agent, or Firm*—Jerome R. Drouillard

[57] ABSTRACT

A system for fueling an automotive vehicle includes a transmitter mounted on the vehicle for identifying the type of fuel required by the vehicle and a fuel control and communication subsystem providing fuel which is blended to achieve the characteristics called for by the vehicle mounted transmitter.

10 Claims, 1 Drawing Sheet

AUTOMOTIVE VEHICLE FUELING SYSTEM

BACKGROUND OF THE INVENTION

1. Technical Field

The present invention relates to a system for providing an automotive vehicle with a correct blend of base and additive fuel stocks.

2. Disclosure Information

As governmental regulations pertaining to automotive exhaust emissions become ever more stringent, it is becoming necessary to provide fuels which are adapted to a particular vehicle being refueled. For example, it may be necessary to provide more highly oxygenated fuels to certain vehicles. With diesel engines, and other types of engines, it may be necessary to provide enriched fuels or auxiliary fluids such as water-borne urea additives which would, for example, be placed in a separate tank of a vehicle, so as to be available for an aftertreatment process within a vehicle's catalytic control system.

Another factor affecting fueling in the future will be the use of fuel cells which cannot operate with fuel additives such as detergents and anti-wear additives for fuel pump protection which are necessary for diesel and gasoline engines.

As a result of the varying fuel needs presented by future model vehicles, it would likely be necessary to burden the fuel infrastructure with the need to distribute many different types of blended fuels. However, a system according to the present invention avoids the need for distributing various types of blended fuels by providing a base fuel and additive system.

Another problem with requiring different types of fuels is that improper fueling becomes a possibility. It may be difficult for future consumers to know and specify exactly what fuel is needed for a vehicle. A system according to the present invention overcomes this problem.

Finally, in the event that an automotive emission control system has adaptable controls so that, for example, a change in the efficiency of the control system may be corrected through the use of a fuel having a specific additive, it is desirable to be able to communicate this change in the fueling need of the vehicle to the fueling station. A system according to the present invention accomplishes this need.

Although the Mobil Oil Corporation currently has an electronic transponder device which communicates with a fuel pump so as to identify the holder of a fuel or other type of credit card, no information is communicated regarding the fueling needs of the vehicle.

SUMMARY OF THE INVENTION

A system for fueling an automotive vehicle includes a dispensing subsystem for providing a plurality of fuel components to an automotive vehicle, a transmitter mounted on the vehicle for identifying the type of fuel required by the vehicle, and a fuel control and communication subsystem for communicating with the vehicle through the transmitter so as to determine the type of fuel required by the vehicle. The control and communication system operates a fuel dispensing subsystem so as to provide the vehicle with the required blend of fuel components.

It is an advantage of the present invention that misfueling of vehicles, i.e., providing a fuel which is not appropriate for the vehicle, may be avoided.

It is another advantage of the present invention that custom blended fuel will allow vehicle efficiency to be increased. For example, a vehicle may be operated with fuel having a precise octane level needed by the vehicle to operate the engine spark advance at the most efficient point without charging the vehicle operator for unneeded octane. This octane requirement will be determined by the vehicle's on-board engine controller and communicated with the fuel dispensing system according to one aspect of the present invention.

Other objects and features as well as advantages of the present invention will become apparent to the reader of this specification.

DETAILED DESCRIPTION OF PREFERRED EMBODIMENTS

Figure 1:
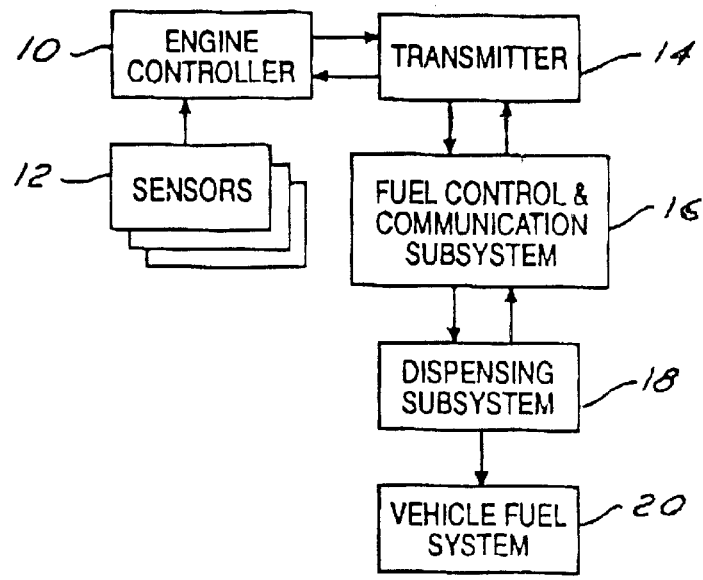
FIG. 1 is a block diagram of a system according to the present invention.

As shown in FIG. 1, engine controller 10, which is drawn from a class of engine controllers known to those skilled in the art and suggested by this disclosure, receives engine operating information from a variety of sensors 12. Such sensors may include, without limitation, sensors for engine speed, vehicle speed, throttle position, ambient air temperature, fuel composition, engine knock, and other sensors. Fuel composition may include a percentage of oxygenates, alcohols, and other types of fuel components. Sensors 12 may also include an NOx or other exhaust gas component sensor. Thus, engine controller 10 may sense knock or some other engine operating parameter and determine that the vehicle engine requires fuel having a greater or lesser octane. If such is the case, engine controller 10 will determine the desired value for octane and transmit this value to transmitter 14, wherein the value for octane, which is a blendable fuel characteristic, is stored. This is shown at block 30 of FIG. 2. Then, when the vehicle is brought to a filling station, the stored value for the desired blendable characteristic or property, in this case, octane, will be transmitted by transmitter 14, which may be either a transponder or other type of transmitter which is carried upon or housed within the vehicle. Transmitter 14 will transmit the value of the blendable characteristic to fuel control and communication subsystem 16, which would preferably be housed at a filling station. Fuel control and communication subsystem 16 will communicate with the vehicle as noted above through transmitter 14 so as to determine the type of fuel required by the vehicle. For example, in the case of octane, high octane fuel having octane in excess of 100, may be blended with lower octane fuel in the area of 85 octane or less so as to achieve a blend having a desired octane rating.

Other characteristics which could be handled with a system according to the present invention would be oxygenates, or special fuels needed by diesel engines, as opposed to a similar fuel which could be consumed by vehicles having fuel cells but which cannot tolerate the detergents and other anti-wear additives required by internal combustion engines.

According to another aspect of the present invention, engine controller 10 may also be used to specify auxiliary fluids such as urea containing fluids for use with NOx aftertreatment systems. In this case, controller 10 will keep track of the amount of the auxiliary fluid within a separate holding tank carried on the vehicle. And, controller 10 will advise the fluid control and communications subsystem in the event that additional auxiliary fluid is needed. Other auxiliary fluids could comprise, for example, water, or other types of fluids known to those skilled in the art and suggested by this disclosure.

Figure 2:
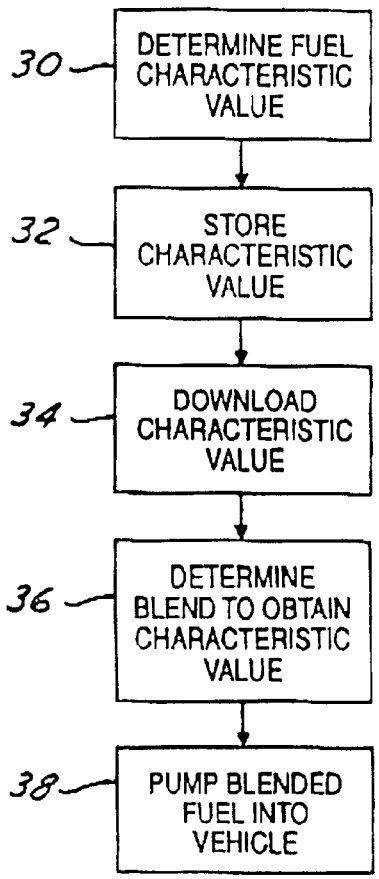
FIG. 2 is a block diagram illustrating a method of refueling according to the present invention.

Turning to FIG. 2, a method according to the present invention includes the determination of a fuel characteristic value at block 30. This value is stored at block 32 and downloaded to fuel control and communication subsystem 16 at block 34. At block 36, fuel control and communication subsystem 16 determines the blend of fuel components required to obtain the desired characteristic value. Finally, at block 38, control and communication system 16 commands dispensing system 18 to furnish fuel having the desired characteristic to vehicle fuel system 20.

What is claimed is:

1. A system for fueling an automotive vehicle, comprising:
    a dispensing subsystem for providing a plurality of fuel components to an automotive vehicle;
    a transmitter, adapted to be mounted on a vehicle, for identifying the type of fuel required by the vehicle; and
    a fuel control and communications subsystem for communicating with a vehicle through the transmitter, so as to determine the type of fuel required by the vehicle, with said control and communications system also operating the fuel dispensing subsystem so as to provide the vehicle with the required blend of fuel components.

2. A system according to claim 1, wherein the fuel dispensing subsystem is equipped with a plurality of liquid fuel components.

3. A system according to claim 1, wherein the fuel dispensing subsystem is equipped with at least one liquid fuel component and at least one gaseous fuel component.

4. A system according to claim 1, wherein the fuel dispensing subsystem is equipped with at least one base liquid fuel component and at least one fuel additive.

5. A system according to claim 1, wherein said transmitter comprises a transponder.

6. A system according to claim 1, wherein said transmitter comprises a transmitter having an output which is a function of at least one engine operating parameter.

7. A system for fueling an automotive vehicle, comprising:
    a fuel dispensing subsystem for providing at least one base fuel, at least one fuel additive, and at least one auxiliary fluid to an automotive vehicle;
    a transponder, mounted on a vehicle, for identifying the type of fuel, fuel additive, and auxiliary fluid required by th e vehicle; and
    a fuel control and communications subsystem for communicating with a vehicle through the transponder, so as to determine the type of fuel, fuel additive, and auxiliary fluid required by the vehicle, with said control and communications system also operating the fuel dispensing subsystem so as to provide the vehicle with the required blend of base fuel and fuel additive, as well as the auxiliary fluid.

8. A system according to claim 7, wherein said at least one base fuel comprises a gaseous fuel.

9. A system according to claim 7, wherein said at least one auxiliary fluid comprises a urea solution which is not mixed with the base fuel, but which is carried in a tank separate from the vehicle's fuel tank.

10. A method for fueling an automotive vehicle, comprising the steps of:
    providing a fuel dispensing subsystem for furnishing a plurality of fuel components to an automotive vehicle;
    determining a desired value for at least one blendable fuel characteristic, based upon a sensed value of at least one engine operating parameter, with said determination being performed by an on-board engine controller;
    receiving and storing the desired blendable characteristic value within a memory located within a transmitter operatively connected with the engine controller, with said transmitter being carried upon the vehicle;
    communicating with the vehicle through the transmitter by means of a stationary control and communications system, so as to receive the blendable characteristic value from the transmitter;
    determining the blend of fuel components required to obtain the desired blendable characteristic value; and
    operating the fuel dispensing subsystem so as to provide the vehicle with a blend of fuel components required to obtain the blendable characteristic value.

* * * * *